April 29, 1969 J. G. AUGENSTEIN ET AL 3,441,662
FEED-THROUGH SEAL
Filed May 2, 1967
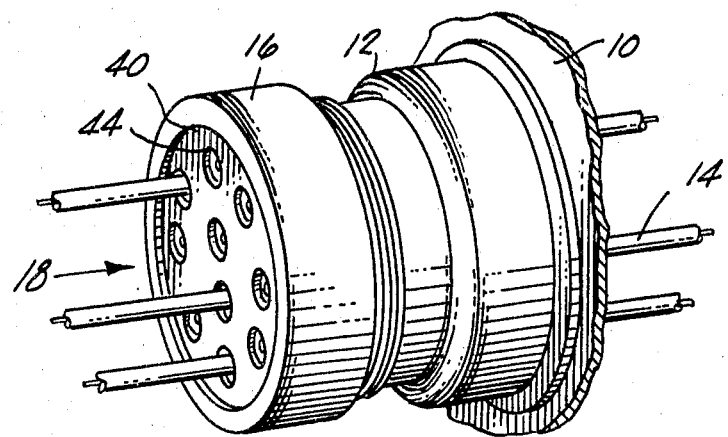
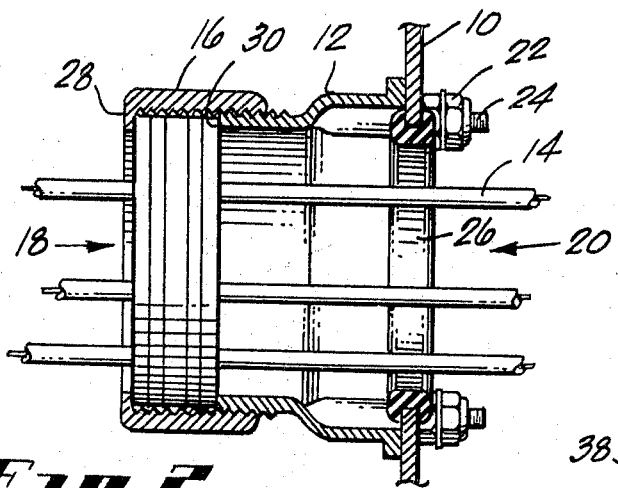
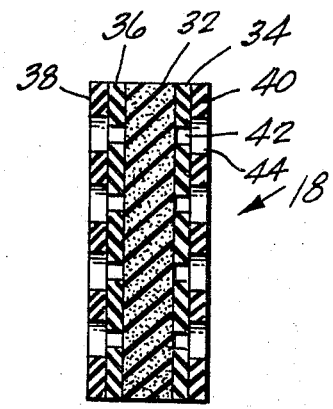
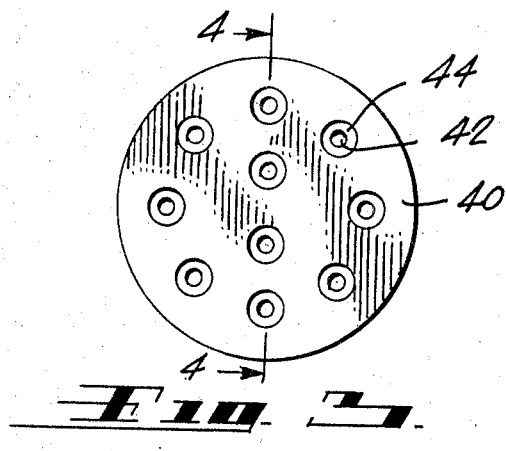
INVENTOR.
JOHN G. AUGENSTEIN
NEAL C. ENAULT
By Robert O. Richardson
ATTORNEY

United States Patent Office 3,441,662
Patented Apr. 29, 1969

3,441,662
FEED-THROUGH SEAL
John G. Augenstein, Placentia, and Neal C. Enault, Long Beach, Calif., assignors, by mesne assignments, to McDonnell Douglas Corporation, Santa Monica, Calif., a corporation of Maryland
Filed May 2, 1967, Ser. No. 635,593
Int. Cl. H01b *17/26, 17/30*
U.S. Cl. 174—151          4 Claims

ABSTRACT OF THE DISCLOSURE

Innerchangeable seals are provided for feeding electrical or fluid conductors through a differential pressure chamber wall. The sealing assembly consists of a mounting housing containing a feed-through gland having an inner cellular core having resilient glands on both sides with retainers on the outer sides to compress the cellular core around a conductor that is passed therethrough.

Background of the invention

This invention relates to structure for permitting the passage of conductors through a wall wherein the wall serves to maintain a differential pressure thereacross. Typically, electrical conductors are passed through a hole in a chassis and, to protect the wire from contact with the edge of the wall, a resilient grommet is placed around the conductor. If the wall is to additionally maintain a differential pressure, a thin rubber gland may be used that would be held between two rigid retainers. A hole is made in the gland smaller than the outer diameter of the wire to be used and, after the wire has been passed through, the gland is then put under compression by the retainers. Sealing problems are complicated by the fact that the hole in the gland becomes eroded during the wire pull through and in cases where some holes are not used, it is necessary to install hole filler plugs. In addition to these problems, the installer was required to handle three separate parts, namely, the center rubber gland and the two rigid retainers. Another method of maintaining a pressure differential across a wall having conductors passing therethrough is to use some encapsulating material. This normally is an undesirable practice.

Summary of the invention

In accordance with the present invention, a sealing assembly is mounted over the opening in the wall through which the conductors are to be passed. This assembly consists of a mounting housing containing a feed-through gland through which conductor feed-through openings may be made, as desired. This gland consists of an inner cellular core having resilient glands on both sides to maintain the conductors' position and to absorb most of the abrasion during the wire pull through. The cellular core, when compressed, tends to flow around the conductor to provide the seal. The seal is enhanced by retainers on the outer sides of the resilient glands which are forced together to compress this cellular core. No sealing plugs are required for unused holes and the sealing support and abrasion resistance is provided by the several layers of different materials comprising the sealing gland.

Brief description of the drawings

FIGURE 1 is a perspective view showing the wall, housing, glands and conductors extending therethrough;
FIG. 2 is a sectional view showing more clearly the cooperation of the various parts;
FIG. 3 is an end view of the glands; and
FIG. 4 is a sectional view of the gland taken along the line 4—4 in FIG. 3.

Description of present embodiment

Referring now to FIG. 1 there is shown a wall 10 which is used as a differential pressure barrier. This wall might be part of a pressurized compartment in an aircraft, for example, or any of a number of uses wherein differential pressure is part of the environment. Housing 12 is secured to wall 10 with its inner edge 11 in a pressure tight relationship over an opening through which conductors 14 must pass. A coupling nut 16 is threadedly connected to housing 12 and contains a sealing feed-through gland 18 through which the conductors 14 pass. This gland 18 has a characteristic of softness such that it flows under compression and yet has a high abrasion resistance so that it will not have severe erosion during the conductor pull.

Referring now to FIG. 2 it can be seen that housing 12 is affixed over an opening 20 in wall 10 and is secured thereto by a nut 22 and bolt 24 arrangement. Grommet 26 is positioned over the edge of the opening in wall 10 to protect the conductors 14 from engagement therewith. Coupling 16 is threadedly engaged at the end of housing 12. Coupling 16 has an inwardly directed peripheral lip 28. Gland 18 fits between this lip 28 and end 30 of housing 12 which serve to compress the gland when coupling 16 is threadedly engaged with the housing 12.

Referring now to FIGS. 3 and 4, gland 18 consists of an inner cellular core 32 having resilient glands 34, 36 on opposite sides thereof and retainers 38, 40 forming the outer faces of gland 18. The cellular core preferably is of closed cell ethylene-propylene sponge which allows easy wire penetration, is easily compressible and has flow characteristics. One example of such material is MIL–R–3133, RSE–Grade–41, Ethylene-propylene-no skin. No holes are inserted until needed, at which time the foam may be punctured by an awl for conductor insertion. This core thus does not require a seal plug to be used except when a conductor has been removed. Glands 34 and 36 preferably are of an ethylene-propylene rubber (EPR) which has abrasion resistance and wire supporting abilities. One such example of this material is DMS–1849, Type 1, Class 1, Grade 40.

Although the invention is not to be limited thereto, it has been found that when glands 34, 36 are at least .125 inch thick and the cellular core 32 is within a range of .250 to .500 inch thick that the ease of wire insertion is good, the abrasion resistance with respect to sealing is very good, the maintainance of wire position is good, the single wire sealing is excellent, twisted pair sealing is very good and the gland is acceptable for use in maintaining a leak free seal under a 10 p.s.i. differential pressure. Retainers 38, 40 may be of any sufficiently rigid material to effect a uniform compression throughout the material therebetween. The compressive forces must be distributed over the entire gland surface for best results.

Appropriate sized apertures 42, 44 are formed in the glands and retainers in order to accommodate the selected size of conductors passing therethrough.

The five components comprising the gland 18 are preferably cemented together for ease in handling. The foam comprising the cellular core may be purchased with cement on each side to be reactivated with a solvent just prior to assembly. The pre-cut discs comprising the glands need only be moistened with a solvent and assembled in a simple jig designed for aligning the holes in the molded parts. The retainers 38 and 40 are cemented to the glands.

Having thus described a preferred embodiment of the present invention, it is to be understood that other modifications and variations will readily occur to one skilled in the art and that these deviations from the preferred embodiment are to be considered as part of the present invention as defined by the appended claims.

What is claimed is:
1. In combination with a wall having an opening therein,
- a housing mounted over said opening and having its inner end fastened to said wall,
- a coupling having a peripheral inwardly turned lip,
- said coupling and the outer end of said housing having threaded connections therebetween to adjust the spacing between said lip and said outer end,
- a sealing feed-through gland having resilient, compressible, abrasion resistance, conductor sealing characteristics,
- said gland being positioned between said lip and said outer end for compression therebetween, and
- conductors extending through said gland;
    - said sealing feed-through gland consisting of an intermediate core of closed-cell resilient, compressible material having flow characteristics,
    - resilient glands adjacent said core having conductor feed-through apertures therein, and
    - rigid retainer members adjacent said resilient glands to transmit compression forces uniformly throughout said glands and core.
2. The combination as in claim 1 wherein said core consists of closed cell ethylene-propylene sponge material.
3. The combination as in claim 1 wherein said resilient glands are abrasion resistant and have conductor supporting abilities.
4. The combination as in claim 3 wherein said resilient glands are of ethylene-propylene rubber material.

References Cited

UNITED STATES PATENTS

| | | |
|---|---|---|
| 2,318,755 | 5/1943 | Channell. |
| 2,816,069 | 12/1957 | Andrus _____ 174—77 X |
| 2,912,266 | 11/1959 | Nordell _____ 277—125 X |
| 3,039,780 | 6/1962 | Nordell _____ 277—125 |
| 3,068,013 | 12/1962 | Calendine et al. ____ 277—125 X |

FOREIGN PATENTS

| | | |
|---|---|---|
| 53,535 | 7/1945 | France. |
| 1,113,967 | 12/1955 | France. |

LARAMIE E. ASKIN, *Primary Examiner.*

U.S. Cl. X.R.

174—77; 277—4, 112, 125, 233